H. A. MONROE.
FISH NET REEL.
APPLICATION FILED MAY 10, 1912.
1,038,414.
Patented Sept. 10, 1912.
2 SHEETS—SHEET 1.
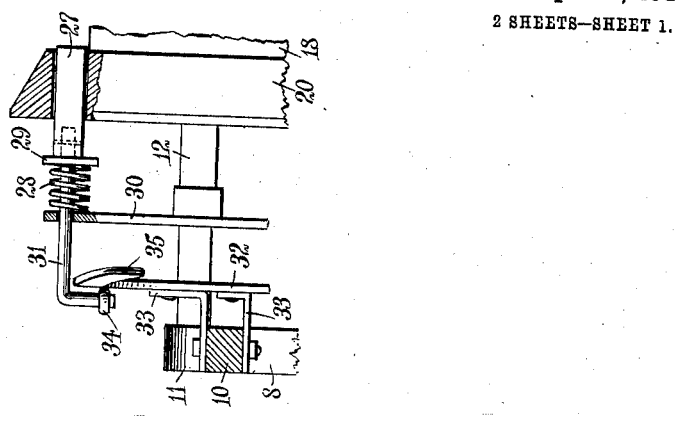
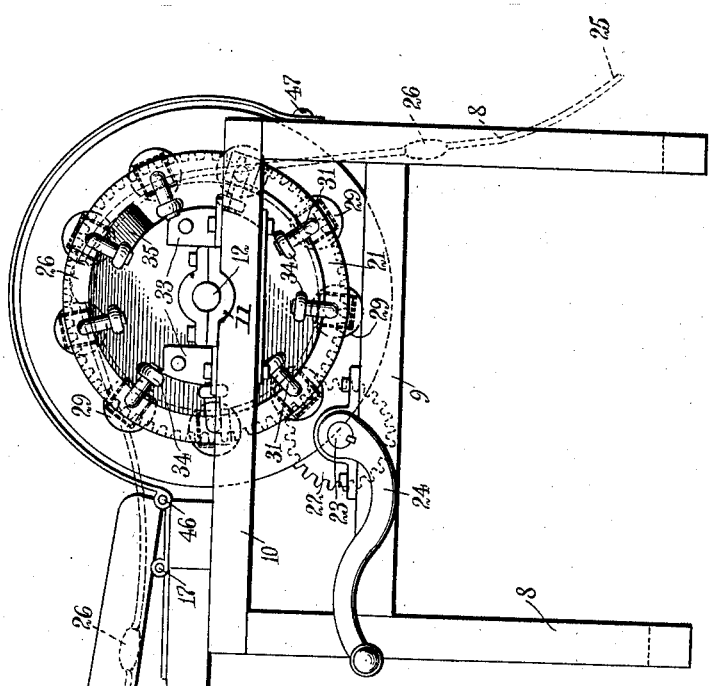
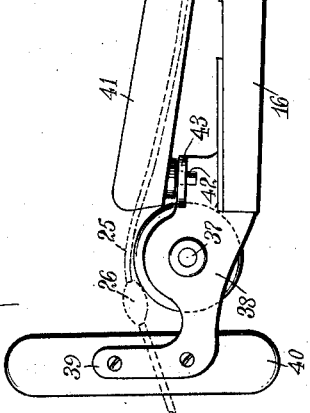
WITNESSES
INVENTOR
Henry A. Monroe
BY
ATTORNEYS H. A. MONROE.
FISH NET REEL.
APPLICATION FILED MAY 10, 1912.
1,038,414.
Patented Sept. 10, 1912.
2 SHEETS—SHEET 2.
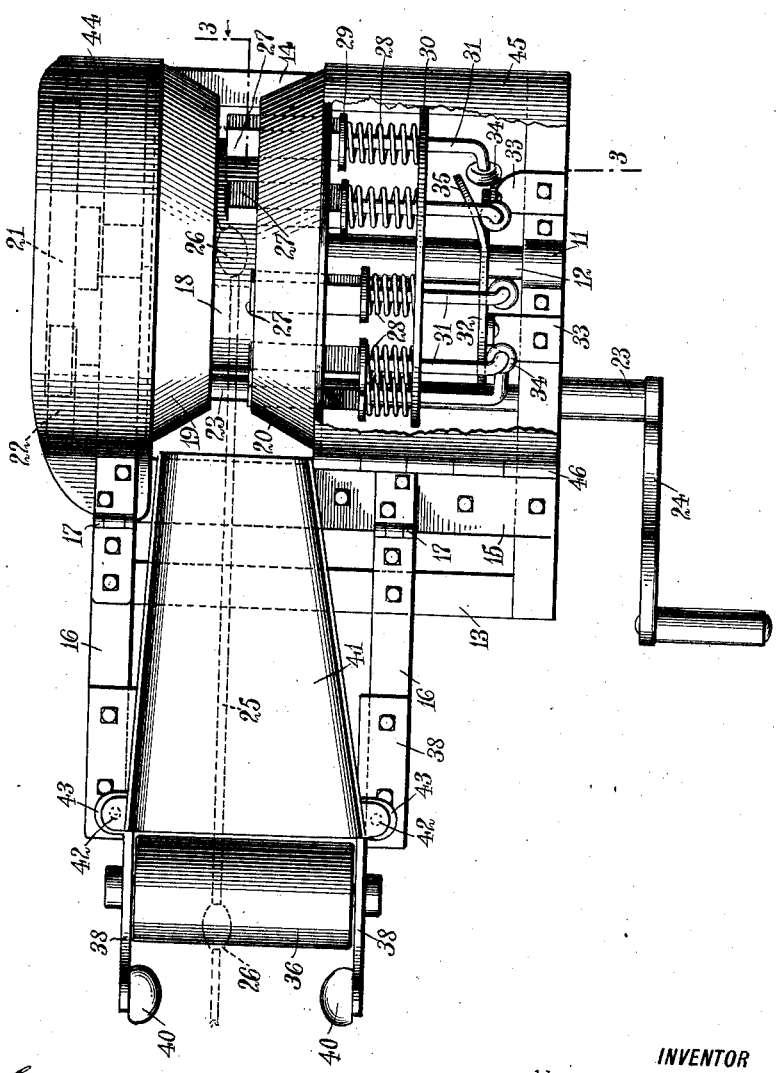
WITNESSES
INVENTOR
Henry A. Monroe
BY
ATTORNEYS

UNITED STATES PATENT OFFICE.

HENRY A. MONROE, OF ASTORIA, OREGON.

FISH-NET REEL.

1,038,414. Specification of Letters Patent. Patented Sept. 10, 1912.

Application filed May 10, 1912. Serial No. 696,439.

*To all whom it may concern:*

Be it known that I, HENRY A. MONROE, a citizen of the United States, and a resident of Astoria, in the county of Clatsop and State of Oregon, have invented a new and Improved Fish-Net Reel, of which the following is a full, clear, and exact description.

Among the principal objects for which the present invention is designed are: to provide a reel for gathering fish-nets, adapted to be manually or power-driven; to provide a reel having gripping devices which are positive in operation and arranged to yield to a predetermined strain, to avoid breakage of the same; and to provide an outrigger conveyer section for extension beyond the gunwale of the boat or vessel for which the reel is provided.

Reference is to be had to the accompanying drawings forming a part of this specification, in which similar characters of reference indicate corresponding parts in all the views, and in which—

Figure 1 is a side elevation of a reel constructed and arranged in accordance with the present invention; Fig. 2 is a plan view of the same, part of the protective shield being removed; and Fig. 3 is a detail view in vertical section, taken on the line 3—3 in Fig. 2, showing a fragment of the reel and supporting frame therefor.

As shown in the accompanying drawings, the reel proper is mounted upon a supporting frame, the upright members 8 of which are suitably mounted upon the gunwale or thwarts of a fishing boat of any desired type. The frame is braced by cross members 9 and 10. Upon the latter are mounted suitable boxes 11, to form bearings for a shaft 12. The frame is cross-braced by members 13, 14, and 15. The members 13 and 15 are arranged to support the outrigger frame, the members 16 whereof are hinged at 17 to the member 15, and rest, when extended, upon the member 13, as shown in Figs. 1 and 2 of the drawings. The hinge 17 permits the outrigger frame to be shipped or folded upward and inward over the reel supported by the shaft 12. Under service conditions, the outrigger frame and parts carried thereby are extended beyond the gunwale of the boat, while in shipped condition, when said frame rests over the reel, said outrigger frame is inside of the gunwale of the boat, and thus preserved from breakage or accidental collision.

The reel is comprised primarily of a drum 18, which is provided with heavy guide flanges 19 and 20. The flanges 19 and 20 are spaced apart, as shown best in Fig. 2 of the drawings, to form a channel between said flanges, and the perimeters of the flanges are each beveled inwardly to the channel thus formed, to provide delivery surfaces for gathering the net prior to depositing the same in the pit provided therefor. The drum 18 is rigidly mounted upon the shaft 12, and is rotated by any suitable driving mechanism, which is operatively engaged with a gear wheel 21. The gear wheel 21 is fixedly mounted upon the shaft 12, and, as shown in the present drawings, is engaged by a driving pinion 22. The pinion 22 is fixedly mounted upon a shaft 23 extended between the cross members 9 of the supporting frame, and has fixedly mounted thereon a crank handle 24, which may be manually operated.

It will be understood that while I have shown in the drawings the handle 24 as the means for operating the shaft 23, any suitable and known power-driven means could be substituted therefor.

The nets for the handling of which the present apparatus is particularly designed are characterized as cork-floated nets or seines, one form of which is known as a purse-seine. These nets are provided at one edge with floats designed to prevent that edge from sinking below the surface of the water, while the opposite edge is provided with suitable weights, to sink the edge of the net to which said weights are applied. The weights are usually applied to the gathering line to which the lower edge of the net is secured. It is desired that these weights should be spaced apart a distance not greater than one-half of the circumference of the drum 18 of the reel, for the reason that the reel is provided with devices for gripping the gathering line of the net or seine.

To aid in the description of the operation of the reel, I have indicated by dotted lines on Fig. 1 of the drawings a fragment of the gathering line, which is there denoted by the numeral 25, and the weights referred to are denoted by the numerals 26. The gathering line 25 is guided by the inclined surface of the flanges 19 and 20 into the channel between said flanges, to rest upon the surface of the drum 18. To secure the line from slippage on the drum, there are provided gripping heads 27. The heads 27 are mounted at suitable intervals in slots formed in the flange 20, to slide therein to and from the opposite flange 19. Each head 27 is normally moved toward the flange 19 by means of one of a series of spiral springs 28. The springs 28 each rest against one of the disks 29 with which each of the heads 27 is provided. The opposite end of each of the springs 28 rests against a guide disk 30, through perforations in which extend rods 31. Each of the rods 31 is rigidly secured to a head 27, and the office of the various rods is to retract or draw back into open position each of the heads 27, to that end compressing the springs 28. The rods 31 and heads 27 connected therewith are thus moved by a cam plate 32. The plate 32 is stationarily mounted upon brackets 33 secured upon one of the cross members 10. The end of each of the rods 31 is bent to extend over the edge of the plate 32, to bear on the outer side thereof in a track adjacent the periphery thereof. The bent end of each of the rods 31 is provided with a wheel 34, to relieve or diminish the friction of the rods on the plate 32. A portion of the plate 32 in the path of the wheels 34 is cut away to permit the springs 28 to thrust inward toward the flange 19 the heads 27 and rods 31 connected therewith, to permit said heads to grip or force the line 25 against the flange 19 in a manner best shown in Fig. 2 of the drawings. The length of the cut-away portion of the plate 32 is optional, it being intended that sufficient of the plate shall be thus removed to permit a sufficient number of the heads 27 to simultaneously grip the line 25. The plate 32 is bent adjacent the cut-away portion to form inclined surfaces 35, which operate to engage the wheels 34 to move the same back to pass out on the outer surface of said plate 32, and to gradually release the same, so that the heads 27 do not strike with a blow upon the line 25 or weights 26 thereon.

It will be noted that the heads 27 form pockets wherein the weights 26 are held when passing over the reel and the drum 18 thereof. It will also be noticed that in the inner side of the reel or drum, the operation of the inclined surface 35 retracts the heads 27, and thereby releases the line 25 and the weights 26 connected therewith.

It will be observed that as the weights 26 are usually conically-ended, and as the heads 27 are held in engagement with the line 25 by the springs 28, before the strain on the line 25 becomes sufficient to break the line, the springs 28 yield to permit the retraction of the heads necessary to release the engaged weight 26, to relieve the line 25. In this manner, provision is made that the line shall not be broken where the power applied to the shaft 23 is sufficient to break the line, or where the speed of the boat is unchecked and the line has become entangled or snagged.

The line 25 and the seine connected therewith are preferably drawn over a roller 36, the trunnions 37 in the end of which are mounted in bearings formed in brackets 38. The brackets 38 are suitably mounted on the outrigger frame 16. The brackets 38 are further extended from the frame 16 to provide arms 39, upon which are rigidly secured vertical fenders 40, between which the incoming seine is drawn. The seine and line 25 thereof are drawn over the roller 36 onto the trough 41. The trough 41 is provided with raised sides, which are converged to the delivery end of said trough to fold or contract the seine connected with the line 25 to the compass of the flanges 19 and 20. Said trough is removably mounted on the frame 16, having for this purpose pins 42, to receive which the bracket 38 is provided with perforated horizontal extension pads 43. The trough 41 is mounted in service position only when the outrigger frame 16 is in extended position. Prior to lifting the frame on the hinge 17 thereof, the trough 41 is removed by lifting the pins 42 out of the perforations provided in the pads 43. To protect the same from engagement with, or entanglement in, the wheels of the pinion 22, wheel 21, or the rods 31, springs 28 and heads 27, I have provided shields 44 and 45. The shield 45 is provided with a hinge 46, upon which it pivots or swings when said shield is lifted, as sometimes becomes necessary, to afford easy access to the mechanism for operating the heads 27. The shield usually is held in normal position by a screw 47 or other suitable fastening device.

While I have herein described the preferred arrangement of the outrigger frame 16 as extended beyond the gunwale of a boat, it will, nevertheless, be understood that the reel may be so mounted in the boat that the frame 16 will extend within the confines of the boat.

The operation of an apparatus thus constructed and arranged is as follows:—It being desired to draw the net or seine, the end of the gathering line 25 is drawn over the drum 18, and one or more of the weights 26 are arranged in engaged relation with the heads 27. The handle 24, if such be the power employed for rotating the shaft 23, is then properly turned to rotate the drum 18, to draw into the boat the end of the line 25 and the seine connected therewith. As the seine is drawn up, the entangled fish, if any, are collected, and the rotation of the drum continuing, the line 25 and seine are folded or gathered by the fenders 40, trough 41, and flanges 19 and 20, to deliver the seine at the inner side of the reel in a folded or compact rope-like manner, where it is conveniently coiled or stowed.

It will be understood that, if the seine employed be of the purse-seine type, the variation in the operation only would exist in that both ends of the gathering line 25 would be drawn up simultaneously, and both lines 25, with their weights 26, would be gathered by the reel, said weights passing in any suitable manner between the heads 27 in the channel between the flanges 19 and 20.

Having thus described my invention, I claim as new and desire to secure by Letters Patent:—

1. A fish net reel, comprising a drum rotatively mounted and provided adjacent the median plane with an open channel, the surfaces of the periphery of said drum adjacent said channel being inclined inwardly toward said channel; means for gathering and delivering the net upon said inclined surfaces, means for rotating said drum; a plurality of plungers reciprocatively mounted in said drum to move across said channel; a guide disk mounted adjacent said drum, in fixed relation thereto and perforated to form bearings for a portion of said plungers; a plurality of springs interposed between said disk and said plungers, to normally extend said plungers across said channel; and stationary means engaging said plungers to withdraw the same during a certain portion of the rotation of the drum, said plungers being free to move under the influence of said springs during the remaining portion of the rotation of said drum.

2. A fish net reel, comprising a drum rotatively mounted and having in the periphery thereof a centrally-disposed channel, the surfaces adjacent said channel at opposite sides thereof being inclined, to deliver to said channel; a guide trough contracted to deliver a net within the boundary of said periphery and upon the inclined sides thereof; a plurality of plungers reciprocatively mounted in one side of said drum to extend across said channel, said plungers being separated to form pockets therebetween, and said plungers being each provided with a rod extended beyond said drum; a guide disk mounted in fixed relation to said drum to support in guided relation said rods; a plurality of spiral springs infolding said rods and disposed between said disk and said plungers, to normally extend the plungers across said channel; a cam plate stationarily mounted to engage the ends of said rods, to withdraw said plungers during a certain portion of the rotation of the drum, the plunger being free to move under the influence of said springs during the remaining portion of the rotation of said drum; and means for rotating said drum.

3. A fish net reel, comprising a drum rotatively mounted and having in the periphery thereof a centrally-disposed channel, the surfaces adjacent said channel at opposite sides thereof being inclined, to deliver to said channel; a guide trough contracted to deliver a net within the boundary of said periphery and upon the inclined sides thereof; a plurality of plungers reciprocatively mounted on one side of said drum to extend across said channel, said plungers being separated to form pockets therebetween, and said plungers being each provided with a rod extended beyond said drum; a guide disk mounted in fixed relation to said drum to support in guided relation said rods; a plurality of spiral springs infolding said rods and disposed between said disk and said plungers, to normally extend the plungers across said channel; a cam plate stationarily mounted to engage the ends of said rods, to withdraw said plungers during a certain portion of the rotation of the drum, the plunger being free to move under the influence of said springs during the remaining portion of the rotation of said drum; means for rotating said drum; and a plurality of rollers, one mounted on each of said rods to roll over said cam plate.

4. A fish net reel, comprising a drum rotatively mounted and having in the periphery thereof a centrally-disposed channel, the surfaces adjacent said channel at opposite sides thereof being inclined, to deliver to said channel; a guide trough contracted to deliver a net within the boundary of said periphery and upon the inclined sides thereof; a plurality of plungers reciprocatively mounted in one side of said drum to extend across said channel, said plungers being separated to form pockets therebetween, and said plungers being each provided with a rod extended beyond said drum; a guide disk mounted in fixed relation to said drum to support in guided relation said rods; a plurality of spiral springs infolding said rods and disposed between said disk and said plungers, to normally extend the plungers across said channel; a cam plate stationarily mounted to engage the ends of said rods, to withdraw said plungers during a certain portion of the rotation of the drum, the plunger being free to move under the influence of said springs during the remaining portion of the rotation of said drum; means for rotating said drum; and a delivery roller rotatively mounted adjacent the receiving end of said trough, to aid in the delivery of the net to said trough.

5. A fish net reel, comprising a drum rotatively mounted and having in the periphery thereof a centrally-disposed channel, the surfaces adjacent said channel at opposite sides thereof being inclined, to deliver to said channels; a guide trough contracted to deliver a net within the boundary of said periphery and upon the inclined sides thereof; a plurality of plungers reciprocatively mounted in one side of said drum to extend across said channel, said plungers being separated to form pockets therebetween, and said plungers being each provided with a rod extended beyond said drum; a guide disk mounted in fixed relation to said drum to support in guided relation said rods; a plurality of spiral springs infolding said rods and disposed between said disk and said plungers, to normally extend the plungers across said channel; a cam plate stationarily mounted to engage the ends of said rods, to withdraw said plungers during a certain portion of the rotation of the drum, the plunger being free to move under the influence of said springs during the remaining portion of the rotation of said drum; means for rotating said drum; a delivery roller rotatively mounted adjacent the receiving end of said trough, to aid in the delivery of the net to said trough; and vertically-disposed fenders to guide the net for introduction to said trough.

In testimony whereof I have signed my name to this specification in the presence of two subscribing witnesses.

HENRY A. MONROE.

Witnesses:
CLEM C. INGALLS,
EDWARD E. GRAY.

---

Copies of this patent may be obtained for five cents each, by addressing the "Commissioner of Patents, Washington, D. C."